United States Patent Office 2,886,535
Patented May 12, 1959

2,886,535

CATALYST COMPOSITIONS

Carl B. Linn, Riverside, Ill., assignor, by mesne assignments, to Universal Oil Products Company, Des Plaines, Ill., a corporation of Delaware No Drawing. Application July 30, 1956
Serial No. 600,650

3 Claims. (Cl. 252—433)

This application is a continuation-in-part of my copending application Serial No. 504,382, filed April 27, 1955, now U.S. Patent No. 2,830,959.

This invention relates to a novel compositions of matter and more particularly to novel compositions of matter comprising complexes of boron halide and certain metal halides, the metal in said metal halides being characterized by being in the valence state of 3.

The novel complexes of the present invention are of special utility as components of catalyst compositions for effecting the conversion of organic compounds and particularly hydrocarbons. As will be illustrated in the examples appended to the present specification, the complex, in conjunction with hydrogen halide, provides a catalyst composition of exceptional activity. In these reactions the complex alone does not function as a catalyst but only as a component of the catalyst composition. However, for some other reactions, the complex alone serves to catalyze the reactions and, in such cases, the complex may be used either alone, or if desired, along with hydrogen halide.

In one embodiment, the present invention relates to a novel composition of matter comprising a complex of a boron halide and an iron group metal halide, the metal in said iron group metal halide being characterized by being in the valence state of 3.

In a specific embodiment, the present invention relates to a composition of matter comprising a complex of boron trifluoride and ferric fluoride.

In another specific embodiment, the present invention relates to a composition of matter comprising a complex of boron trifluoride and cobaltic fluoride.

It will be noted that the novel compositions of the present invention comprise complexes of boron halides and certain metal halides. Of the boron halides, boron trifluoride is particularly preferred, especially when utilized in conjunction with an iron group metal fluoride, the metal in said iron group metal fluoride being characterized by being in the valence state of 3. Other boron halides include boron trichloride, boron tribromide, and boron triiodide. Of the iron group metal halides in which the metal is characterized by being in the valence state of 3, the iron group metal fluorides are particularly preferred. Such preferred compounds include ferric fluoride, cobaltic fluoride, and nickelic fluoride. Other iron group metal halides in which the metal in the metal halide is characterized by being in the valence state of 3 include ferric chloride, ferric bromide, ferric iodide, cobaltic chloride, cobaltic bromide, cobaltic iodide, nickelic chloride, nickelic bromide, and nickelic iodide. The preferred complexes will be those in which the halogen atoms of the boron halide and the halogen atoms of the iron group metal halide are the same.

As set forth hereinabove, the metal in the iron group metal halide is characterized by being in the valence state of 3. The complex is believed to be of the formula $MX_3 \cdot BX_3$ where X is a halogen atom. However, applicant does not intend to limit himself to this specific explanation and thus the composition may include complexes containing less than 1, 2 and possibly more $BX_3$ constituents complexed with the metal halide. Because of the theoretical formula hereinbefore set forth, and because of the method in which the complex is prepared, as well as the stability of boron halides, particularly boron trifluoride, it is believed that the boron halide constituent is present as such in the complex and does not become dissociated.

The complexes of the present invention generally are non-fuming solid materials and are stable at ordinary temperature and pressure; however, they lose boron halide when heated. Therefore, the complex should not be heated to high temperature at atmospheric pressure. When it is desired however, to heat the complex or to conduct reactions at elevated temperature, the heating and reaction should be effected under sufficient pressure to preclude a loss of boron halide.

The complex may be formed in any suitable manner. In one method, boron halide is reacted with the desired metal halide to form the complex. Since the complexes are ordinarily not formed as readily as one would desire, it is usually necessary to carry out this reaction in the presence of appropriate hydrogen halide and under sufficient pressure to insure a reaction of the boron halide with the desired metal halide. The metal halide preferably is in an anhydrous state and conveniently comprises ferric fluoride or cobaltic fluoride. The reaction of boron trifluoride with these metal fluorides is exothermic. The complex as formed in the above manner may be utilized as a catalyst either as a liquid solution or as a solid mass. When utilized as a liquid, the complex preferably is prepared as a solution in anhydrous hydrogen halide. This embodiment is particularly desirable when the complex is utilized along with hydrogen halide as the catalyst composition. The complex in general is soluble in hydrogen halide only to a small extent and thus the catalyst composition will comprise an excess of hydrogen halide. It is understood that in some cases an excess of solid complex may be employed as the catalyst and the catalyst, in this embodiment, will comprise a mixture of liquid and solid phases. When utilized as a solid mass, the complex may be disposed as a fixed bed in a reaction zone. When employed, hydrogen halide may be introduced into the reaction zone along with the reactants or in any other suitable manner.

In still another embodiment in which the complex is utilized as a solid mass, the complex may be prepared as a composite with a suitable supporting material. The supporting material preferably is not reactive with hydrogen halide and is porous. A particularly preferred support comprises activated charcoal. Other supporting materials may comprise certain metal fluorides including, for example, aluminum fluoride, calcium fluoride, magnesium fluoride, strontium fluoride, barium fluoride, etc. as well as other solid metal halides or other metal compounds which will not be dissolved, removed or otherwise adversely affect during use as a catalyst in effecting the hydrocarbon conversion reaction. The composite of complex and support may be prepared in any suitable manner.

As hereinbefore set forth, for effecting some reactions the complex preferably is utilized in conjunction with hydrogen halide. The halogen of the hydrogen halide is preferably the same as the halogen atoms of the complex of the boron halide and iron group metal halide. It is understood that, in some cases, certain halogen containing compounds and particularly alkyl halides, including alkyl fluorides, alkyl chlorides, alkyl bromides, and alkyl iodides may be utilized in place of or along with the hydrogen halide. Specifically, such alkyl halides include ethyl fluoride, propyl fluoride, butyl fluoride, amyl fluoride, hexyl fluoride, etc., ethyl chloride, propyl chloride, butyl chloride, amyl chloride, hexyl chloride, etc., ethyl bromide, propyl bromide, butyl bromide, amyl bromide, hexyl bromide, etc., ethyl iodide, propyl iodide, butyl iodide, amyl iodide, hexyl iodide, etc., or mixtures thereof. It is understood that polyhalo-alkane compounds, halo-cyclic compounds, and/or polyhalo-cyclic compounds may be utilized in some cases. Furthermore, it is understood that these various modifications are not necessarily equivalent and that suitable modifications in operation may be necessary to accommodate these changes.

When utilized along with hydrogen halide, the proportions of hydrogen halide and complex may vary over a wide range as, for example, from 0.01 to 1 or less to about 200 to 1 or more, and preferably from 0.5 to 1 to 150 to 1, molar proportions of hydrogen halide per molar proportion of complex. The specific proportions generally will depend upon the particular reaction being catalyzed and whether the complex is utilized as a solution in hydrogen halide or as a solid mass.

The catalyst composition of the present invention may be utilized for effecting various reactions of organic compounds and particularly of hydrocarbons. These reactions include (A) condensation reactions in which two molecules, which may be the same or different, are condensed to form a larger size molecule, (B) destructive reactions in which a molecule is decomposed into a smaller size molecule or into two or more molecules, (C) rearrangement reactions as, for example, isomerization, (D) disproportion reactions in which a radical is transferred from one molecule to another molecule, (E) hydrogenation reactions, and (F) other reactions. Among these reactions are (1) polymerization of olefins and particularly of ethylene, propylene, butylenes, amylenes, and higher boiling olefins or mixtures thereof, (2) alkylation of isoparaffins with olefins or with other alkylating agents including, for example, alkyl halides, etc., and particularly the alkylation of isobutane, isopentane, and/or isohexane with ethylene, propylene, butylenes, amylenes, etc., or mixtures thereof, (3) alkylation of aromatics with olefins and other alkylating agents, and particularly the alkylation of benzene, toluene, etc., with propylene, butylenes, amylenes, and higher boiling olefins such as nonenes, decenes, undecenes, dodecenes, tridecenes, tetradecenes, pentadecenes, etc., or mixtures thereof, (4) isomerization of paraffins and particularly of n-butane, n-pentane, n-hexane, n-heptane, n-octane, etc., or mixtures thereof, (5) isomerization of naphthenes as, for example, isomerization of methylcyclopentane to cyclohexane, isomerization of dimethyl cyclopentanes to methylcyclohexanes, etc., (6) alkylation of phenols or thiophenols with olefins or other alkylating agents, (7) alkylation of thiophenes with olefins, (8) hydrogen transfer reactions, (9) alkyl transfer reactions, (10) dealkylation reactions, (11) dehydrogenation of saturated hydrocarbons including paraffins, naphthenes, etc., to form unsaturated compounds including olefins, cycloolefins, etc., or the dehydrogenation of the unsaturated compounds to form more highly unsaturated compounds as diolefins, cyclodiolefins, aromatics, etc., (12) reforming of gasoline or naphtha to improve the antiknock characteristics thereof, (13) destructive hydrogenation reactions, (14) cracking of oil heavier than gasoline into lower boiling products and particularly gasoline, (15) hydrogenation reactions in which an unsaturated compound is hydrogenated to a more saturated compound as, for example, the hydrogenation of diolefins to olefins, olefins to paraffins, cycloolefins to naphthenes, etc., (16) reductive alkylation reactions as, for example, the reductive alkylation of an amino compound and particularly an aromatic amino compound including aniline, phenylene diamine, naphthyl amine, etc., with a ketone, or aldehyde, etc., in order to replace one or more of the hydrogens attached to the nitrogen atom or atoms with a hydrocarbon substituent, and (17) other reactions of hydrocarbons or other organic compounds. The operating conditions to be employed will depend upon the particular reaction and generally will be at ambient temperature, although elevated temperatures may be employed, particularly with superatmospheric pressures. In some reactions it may be preferred to utilize pressures less than atmospheric pressure. Thus the temperature may range from —50° C. or less to 300° C. or more, preferably 0° C. to 150° C., and the pressure may range from less than atmospheric to 5000 lbs./sq. inch or more, preferably from atmospheric to 200 lbs./sq. inch. Hydrogen may be employed when required or of advantage.

The process may be effected in any suitable manner, which will depend upon the particular reaction and the form in which the catalyst is used. When the catalyst is used as a solution, a convenient method is to pass the reactant or reactants and catalyst through suitable mixing means and thereby effecting intimate contact between the reactants and catalyst. In one method, this may be accomplished by utilizing reaction equipment with suitable agitating means. In another method, the mixture of reactant or reactants and catalyst may be passed through orifice mixers, etc., and then through suitable time tanks to effect the desired contacting. Other well known means may be utilized to effect the desired contacting of the reactants and catalyst. When the complex is used as a solid mass, it may be disposed as a fixed bed in a reaction zone, and the reactants and hydrogen halide, when employed, are supplied thereto in any suitable manner. The reactants may be passed either in upward or downward flow through the catalyst bed. In one method, hydrogen halide, when employed, may be commingled with all or a portion of one of the reactants and the mixture supplied to the reaction zone. In this embodiment, a convenient method is to pass all or a portion of the reactant or, in the case two reactants are employed, to pass all or a portion of one of the reactants, usually the less reactive material, continuously or intermittently through a body or pool of liquid hydrogen halide, and this reactant saturated with hydrogen halide then is introduced into the reaction zone. When desired, the hydrogen halide may be supplied separately to the reaction zone and passed concurrently or counter-currently to the reactants. In still another embodiment, the hydrogen halide may be introduced at a midpoint in the reaction zone, or, when desired, the hydrogen halide may be introduced at either the upper or lower portion of the reaction zone and the reactants introduced at a midpoint in the reaction zone.

The hydrogen halide, when employed, may be introduced continuously or intermittently as desired. In some cases, the hydrogen halide may be introduced initially in the operation and the flow of hydrogen halide discontinued during part or all of the remainder of the operation. Apparently, sufficient hydrogen halide is retained in the reaction zone, possibly in a chemical or physical association with the complex, to produce the desired catalyst effect. Also, in some cases, boron halide may be introduced into the reaction zone during the conversion process, either continuously or intermittently, especially in operations where boron halide may be evolved and removed with the effluent products from the reaction zone. Regardless of the particular operation employed, the products are fractionated or otherwise separated to recover the desired product and to separate unconverted material for recycling. Hydrogen halide when present in the effluent product likewise is separated and preferably is recycled. Similarly, when boron halide is present in the effluent product, it may be separated and either recycled to the reaction zone or reused in preparing additional complex. The following examples are introduced to illustrate further the novelty and utility of the present invention but with no intention of unduly limiting the same.

Example I

A complex of ferric fluoride and boron trifluoride was prepared in the following described manner, the ferric fluoride itself being prepared first. Eighty-one grams of ferric chloride was charged to a one liter stirred autoclave which was then sealed, and evacuated and cooled to −50° C. Two hundred and four grams of anhydrous hydrogen fluoride was then charged into the autoclave. A temperature rise of more than 20° C. was observed during the hydrogen fluoride addition. The cooling bath was removed and the mixture stirred. No pressure was observed until the temperature approached −30° C. at which temperature the pressure began to rise rapidly due to HCl formation. The temperature of the mixture rose to room temperature in about 3 hours time and the pressure at this temperature reached a plateau of about 235 p.s.i.g. Since the partial pressure of hydrogen fluoride at room temperature is from about 15 to about 20 p.s.i.g., it is obvious that reaction has taken place and that the increased pressure is due to the formation of hydrogen chloride. The autoclave was allow to stand overnight after which time the pressure was released at a temperature of 30–40° C. to eliminate excess HF. Upon opening the autoclave, 57.5 grams of a gray-pink solid was obtained. This gray-pink solid was found to contain 49.14% iron; the calculated quantity of iron in $FeF_3$ is 49.49%. The $FeF_3$ was also identified by its X-ray diffraction pattern.

Twenty grams of $FeF_3$ prepared as described hereinabove was charged into a 850 ml. rotating steel autoclave which was then evacuated and cooled to ice temperature. Thirty-one grams of anhydrous hydrogen fluoride was then added. The autoclave was then sealed and pressured to 700 p.s.i.g. with boron trifluoride. Within 5 minutes a pressure drop of 60 p.s.i.g. to 640 p.s.i.g. was observed. The autoclave was then rotated for 5.5 hours at room temperature during which time the pressure dropped another 75 p.s.i.g. to 565 p.s.i.g. The autoclave was allowed to stand overnight and the next morning the pressure was 542 p.s.i.g. representing a total pressure drop of 158 p.s.i.g. The pressure was then released and the autoclave stabilized at 40° C. Prior to opening, the autoclave was flushed 3 times with nitrogen. Upon opening, 39 grams of product was recovered. This product was a moderately fuming gray solid, namely, $FeF_3 \cdot BF_3$.

Example II

The complex prepared in accordance with Example I was utilized as a catalyst for the alkylation of benzene with tertiary butyl chloride in an anhydrous and oxygen free system. The charge comprised 39 grams of benzene and 46 grams of tertiary butyl chloride. About 10 grams of the complex was utilized as the catalyst. The run was effected in a glass alkylating flask at a temperature of 25–30° C. for two hours at atmospheric pressure utilizing vigorous stirring. From the product, about 59 grams of tertiary butyl benzene was recovered, corresponding to a 88% yield based on the theoretical amount amount of tertiary butyl benzene which can be formed.

Example III

This example illustrates the utilization of the complex prepared in accordance with Example I for the isomerization of normal butane to isobutane. In the example the complex of ferric fluoride and boron trifluoride is utilized in conjunction with hydrogen fluoride. The charge consists of 100 grams of normal butane and the amount of catalyst utilized is 60 grams of hydrogen fluoride and 15 grams of the complex. This run is made in an anhydrous and oxygen free system utilizing a sealed rotating autoclave and a temperature of 100° C. After 16 hours of contacting, the hydrocarbon product is separated. The product consists of 55% isobutane and 45% normal butane. The normal butane may be recycled for further isomerization thereby increasing the ultimate yield of the desired isobutane.

Example IV

A mixture of hydrogen fluoride and the complex prepared in the manner described hereinabove in Example I is utilized in an anhydrous and oxygen free system for the alkylation of isobutane with propylene at −40° C. This run is effected in a one liter Turbomixer autoclave at 0° C. Twenty-five grams of the complex is sealed into the Turbomixer and 10 grams of liquid hydrogen fluoride are charged thereto. A liquid mixture of isobutane-propylene (244 grams isobutane, 5 grams propane, and 51 grams propylene) is added during a two-hour period. After contact for an additional hour at 0° C., the Turbomixer contents are collected and analyzed as follows: The contents are poured into a copper flask containing water and ice. The non-condensable gases are passed through a stream of soda lime, Dry Ice traps, and a wet test meter. The liquid remaining in the flask is warmed to 30° C. and the condensable gases thus liberated are collected, combined with the condensable gases collected in the Dry Ice traps, and distilled in a low temperature Podbielniak column and analyzed in a mass spectrometer. The liquid in the flask is washed, dried, and distilled.

In the reaction described above, 105 grams of hydrocarbons boiling above isobutane are produced, which calculates as a yield of 206%, the yield being determined as: $100 \times$ grams $C_5+/$ grams $C_3H_6$. In contrast, a run made under substantially the same conditions but using 10 grams of hydrogen fluoride alone as the intended catalyst resulted in substantially no alkylation of isobutane by propylene.

From the above data it will be observed that the mixture of hydrogen fluoride and complex is an active alkylation catalyst under the conditions employed. On the other hand, hydrogen fluoride alone was not effective to catalyze the alkylation reactions at these conditions.

Example V

This example illustrates the use of the catalyst composition for the cracking of normal pentane. The catalyst consists of 56 grams of hydrogen fluoride and 20 grams of complex prepared in the manner described in Example I. One hundred grams of normal pentane are charged to a sealed rotating autoclave and the reaction is effected at 50° C. After 72 hours of contacting, the product contains substantial quantities of propane, butanes, hexanes, and higher boiling paraffins.

Example VI

A complex comprising cobaltic fluoride and boron trifluoride is prepared in substantially the same manner as described hereinabove. Twenty grams of cobaltic fluoride and 50 grams of anhydrous hydrogen fluoride are sealed in a copper lined rotating autoclave and the autoclave is pressured to 600 p.s.i. with boron trifluoride. The autoclave is then rotated at room temperature for 40 hours. After releasing the pressure and removing the hydrogen fluoride, about 35 grams of the $CoF_3 \cdot BF_3$ complex is recovered.

This complex may be utilized, along with hydrogen fluoride for the polymerization of isobutylene at room temperature.

I claim as my invention:

1. A catalyst composition comprising hydrogen fluoride and a complex of equimolar proportions of boron trifluoride and an iron group metal fluoride, the metal in said iron group metal fluoride being characterized by being in the valence state of 3, the composition containing from about 0.01:1 to about 200:1 molar proportions of hydrogen fluoride per molar proportion of complex.

2. A catalyst composition comprising hydrogen fluoride and a complex of equimolar proportions of boron trifluoride and ferric fluoride, the composition containing from about 0.01:1 to about 200:1 molar proportions of hydrogen fluoride per molar proportion of complex.

3. A catalyst composition comprising hydrogen fluoride and a complex of equimolar proportions of boron trifluoride and cobaltic fluoride, the composition containing from about 0.01:1 to about 200:1 molar proportions of hydrogen fluoride per molar proportion of complex.

References Cited in the file of this patent

UNITED STATES PATENTS

| | | |
|---|---|---|
| 2,092,295 | Van Peski et al. | Sept. 7, 1937 |
| 2,142,980 | Huijser et al. | Jan. 3, 1939 |
| 2,217,019 | Ipatieff et al. | Oct. 8, 1940 |
| 2,418,023 | Frey | Mar. 25, 1947 |